United States Patent [19]
Roberson et al.

[11] Patent Number: 5,379,725
[45] Date of Patent: Jan. 10, 1995

[54] SAFETY AND RESTRAINING HARNESS

[76] Inventors: Linda K. Roberson, P.O. Box 1569, Candler, N.C. 28715; Cathy M. Egli, 571 Fagan Dr., Inman, S.C. 29349; Suzanne M. McMillan, P.O. Box 207, Suwannee, Fla. 32602; Keith J. Mackey, P.O. Box 1569, Candler, N.C. 28715

[21] Appl. No.: 154,433
[22] Filed: Nov. 19, 1993
[51] Int. Cl.⁶ .................. A62B 35/00; A47D 15/00
[52] U.S. Cl. .................................. 119/770; 297/465; 280/290; 119/857
[58] Field of Search ............ 119/770, 857, 907; 182/3, 4; 280/290; 297/465

[56] References Cited

U.S. PATENT DOCUMENTS

| | | | |
|---|---|---|---|
| 2,212,746 | 8/1940 | Nunn | 119/770 |
| 2,833,344 | 5/1958 | Lucht | 297/465 |
| 4,026,245 | 5/1977 | Arthur | 297/465 |
| 4,273,215 | 6/1981 | Leggett | 119/857 X |
| 4,445,866 | 5/1984 | Cillieres | 119/770 X |
| 4,927,211 | 5/1990 | Bolcerek | 297/465 |

Primary Examiner—Robert P. Swiatek
Attorney, Agent, or Firm—William F. Hamrock

[57] ABSTRACT

A reinforced safety harness for a child or adult comprising a front vest which covers the front torso, a pair of criss-crossing back straps, a waist belt which encircles the front and back torso secured by an adjustable belt buckle, a reinforcing belt which extends from the belt buckle through reinforcing loops on the front and back of the harness about the torso, a tether belt which extends from the reinforcing belt to be attached to a person's wrist or a restraining element or to be attached to the harness.

40 Claims, 6 Drawing Sheets

SAFETY AND RESTRAINING HARNESS

BACKGROUND OF THE INVENTION

1. Field of the Invention

This invention is an improvement over the child's safety harness of applicant's U.S. Pat. No. 5,069,168. The present invention relates in general to a safety harness for a child or adult, and in particular, to a reinforced, unified safety harness for supporting the child's or adult's upper body wherein a reinforcing belt provides increased support and helps restrain the individual.

2. Description of the Prior Art

U.S. Pat. No. 5,069,168 is directed to a child safety harness and method of identifying a lost child which patent is a tremendous contribution to the art of the protecting and identification of children. The present invention is directed to further advances in the art wherein not only children but also adults are to be protected. Such children and adults would include individuals who because of physical or mental infirmities require special attention. Thus, all the benefits of U.S. Pat. No. 5,069,168 are likewise applicable to the present invention in addition to these further advances which are discussed herein.

A guardian responsible for the safety of individuals realizes the many needs required in carrying out his or her responsibilities in watching over and protecting persons such as children and adults afflicted with mental and/or physical infirmities. These persons who require special protection would include small children, children suffering from mental and physical disorders and adults who are mentally and/or physically disabled.

Because of the particular condition of these persons, a most necessary need would be to have a means to safely restrain and protect them, Another need would be to be able to allow them the freedom to comfortably move about.

A further need would be to have means which would support them physically to help reduce the effects of their afflictions.

Another further need would be to have a means available to identify the person in case the person becomes lost.

Another further need would be to have a means for carrying personal needs.

Another further need would be to have means available to allow the person to rest comfortably.

Another further need would be to protect them from exposure to the elements.

Another further need would be to have a means to help keep their attire and bodies clean and dry.

Another further need would be to have the protective means attractive and pleasant to wear.

Another further need would be to have the protective means to be reversible thereby giving an alternative choice of wear.

SUMMARY OF THE INVENTION

With the above needs of these persons in mind, the present invention relates to an improved safety harness directed to meeting these special needs. Among the improved harness features involved in accomplishing this objective are the following:

A harness which provides a reinforcing means to help support the physical structure of the person.

A harness which is designed and fabricated to provide support for the physically and mentally handicapped.

A harness which is designed and fabricated to be worn comfortably by children and by adults.

A harness which provides a reinforcing structure and tether belt in combination which comfortably restrains the user but allows for freedom of movement.

A harness which is fabricated with elements to be able to carry personal needs.

A harness which has a pillow means to allow the person to rest comfortably.

A harness which provides information to identify the person.

A harness which provides a water-proof, water repellant surface which protects the user from the exposure to the elements and protection from spilling of food and drink.

A harness which provides reversible sides to allow alternative choice of wear.

A harness which provides breathable material for more comfortable wear.

The above objective needs are met with the present safety harness. To our knowledge no harness device exists which contains these features.

DETAILED DESCRIPTION OF PREFERRED EMBODIMENTS

The safety and restraining harness in accordance with the present invention is not merely another safety and restraining harness for children. The safety and restraining harness herein is designed and fabricated to meet the many needs of children and adults who require special attention because of their physical or mental condition but have been overlooked because of the lack of a suitable device to comfortably restrain and protect them. The many features of the present harness are intended to help these individuals.

Figure 1:
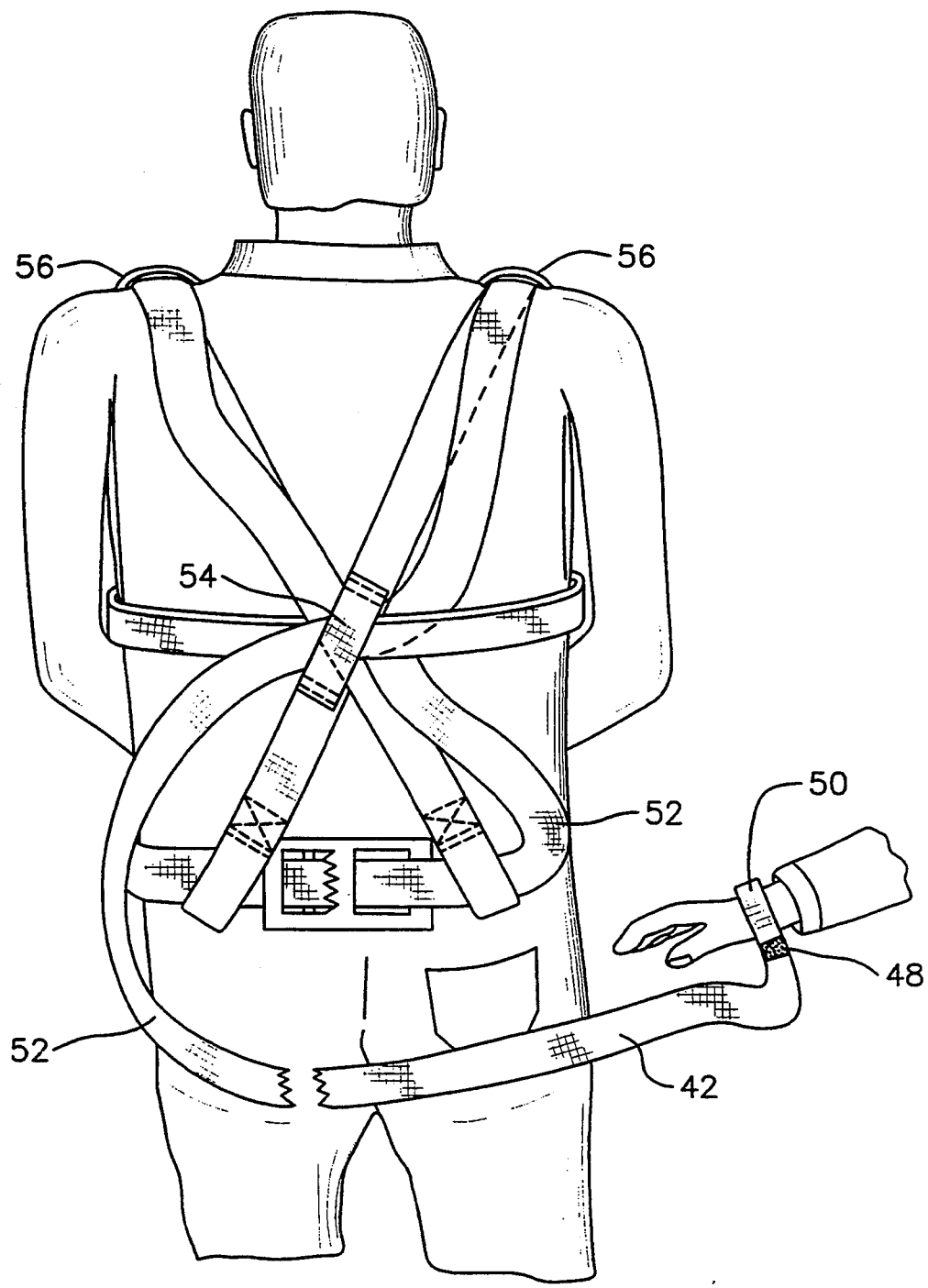
FIG. 1 is a perspective view of a preferred embodiment of a harness being worn by an adult person.
Figure 2:
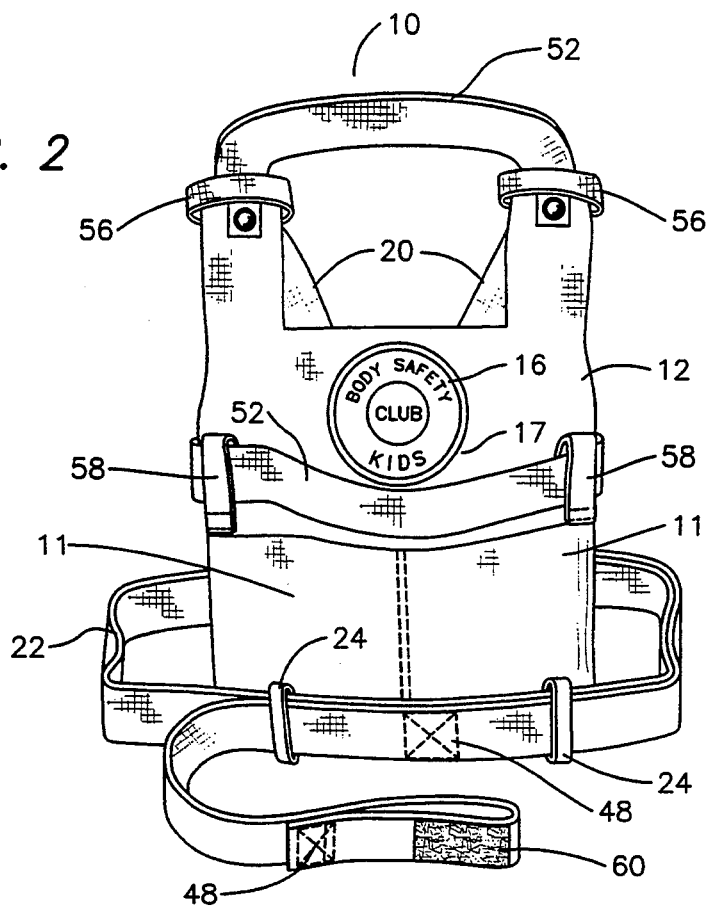
FIG. 2 is a perspective view of a preferred embodiment of the front view of a harness of the invention.

Referring specifically to the drawings, there is seen in FIGS. 1–4 a harness 10 which supports the upper torso of a child or adult. FIG. 2 illustrates a front view depicting front vest 12 having emblem 14 secured thereto. The emblem can depict the logo "Body Safety Kids Club" 16 as shown or other logo or name as desired. A pair of back straps 20 are seen in the back area secured to the top of front vest 12. Waist belt 22 is shown securely attached to front vest 12 by sewing or equivalent attachment. Front belt loops 24 are securely attached to the waist belt as shown. Front double pockets 11 are shown joined together above the waist belt.

Figure 3:
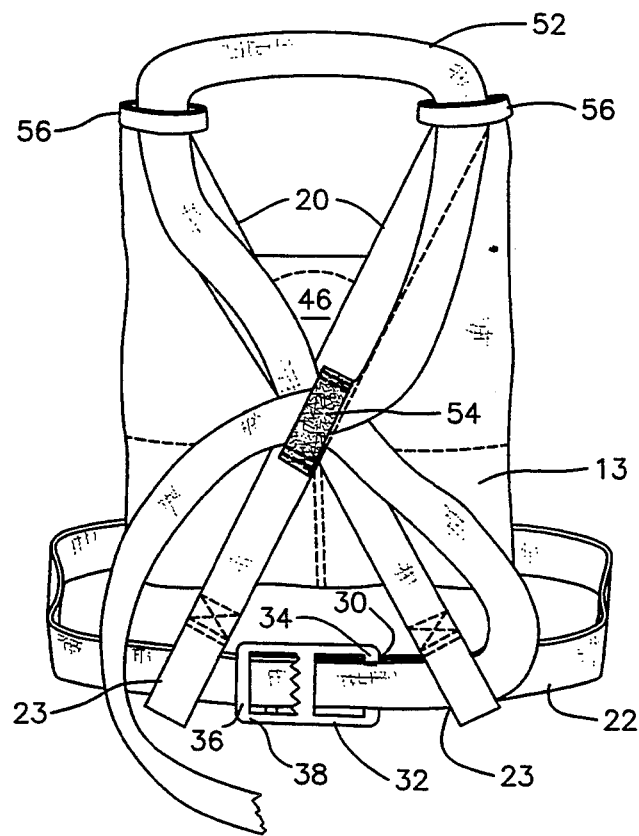
FIG. 3 is a perspective view of a preferred embodiment of the back view of a harness of the invention.

FIG. 3 depicts a back view of a preferred embodiment of the harness. Shown in this embodiment are the back straps 20 criss-crossing and secured by sewing or other means to give strength and permanent support to the harness. The lower end of each back strap forms back strap loop 23 by sewing or equivalent means through which the waist belt 22 is releasably secured therein. In this embodiment, waist belt 22 is shown extending around the right hand side of the back section passing through back strap loop 23 with fastened end 30 permanently secured on belt buckle 32 around belt buckle bar 34. The opposite free end element 36 of waist belt 22 is adjustably secured to belt buckle 32 by locking teeth 38 as shown or similar attachment. As shown, waist belt 22 extends on the left hand side through back strap loop 23 and belt buckle 32 to become reinforcing belt 52.

When a different belt buckle is used instead of buckle 32, the fastened end of the waist belt can be located on the left side of the buckle and the opposite free end of the waist belt can enter from the right side, loop around the buckle bar and exit out on the left side of the buckle so as to pass through loop 23 to become the reinforcing belt 52. An identification marking 46, such as a code or other marking, is shown inscribed on the back of emblem 14.

FIGS. 1 and 3 show reinforcing belt 52 extending up from right hand back strap loop 23. Reinforcing belt 52 imparts support to the harness by reinforcing the back and/or front area of the harness on the person. This is a critical and essential component in the harness by providing young children with additional support to enhance their upright posture and also by providing both children and adults, such as those who are afflicted with physical infirmities, with additional support to help overcome their physical disfigurement.

As seen in FIG. 3, reinforcing loop 54 is attached to the back of the harness at the criss-crossing area of the back strap and reinforcing loops 56 are shown at the shoulder area. Reinforcing loops 58 are seen in FIG. 2 located at the middle area of the harness. Reinforcing belt 52 can pass through some or all of the reinforcing loops 54, 56 and 58 depending upon the body support required for the child or adult user. The physical condition of the user will determine whether some or all of reinforcing belt 52 passes through the reinforcing loops 54, 56 and 58 and whether it further passes through any of the front belt loops 24 and backstrap loops 23 to provide the proper body support to the user.

There are a number of various routes that the reinforcing belt 52 can follow in reinforcing the harness. As shown in FIG. 3, reinforcing belt 52 extends from right hand back belt loop 23 up through loop 54 at the criss-crossing of the back straps, up through and across through loops 56 at the top of the back straps, and back down through a loop 54 at the criss-crossing of the back straps.

Figure 4:
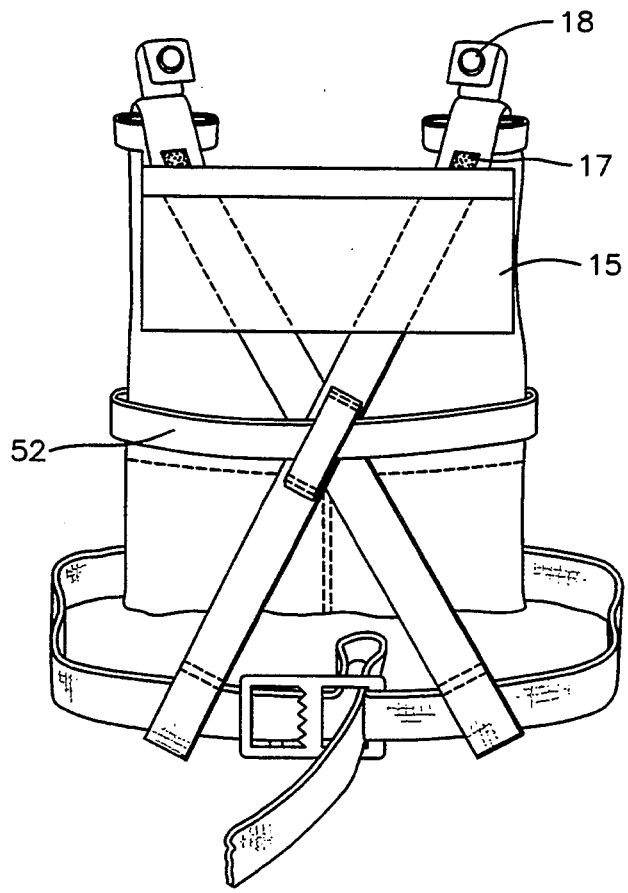
FIG. 4 is a perspective view of a preferred embodiment of a harness of the invention showing a back pack.

There are a multiple of variations of the routes of reinforcing belt 52. In addition to many reinforcement procedures at the back of the harness reinforcing belt 52 also can be routed across the front of the harness in a criss-crossing, or horizontal, or vertical route. The reinforcement technique to be used will depend upon the requirements of the person to be supported. Examples of a horizontal route of reinforcing belt 52 across the front of the harness is seen in FIG. 2 and across the back of the harness is seen in FIG. 4. Other accessory means of reinforcement can also be used in combination with the harness.

As seen in FIG. 1, tether belt 42 extends from the reinforcing belt 52 and terminates into releasably securing tether loop 50. The tether loop is formed by joining together tether loop sections either by sewing or making it releasably secured, such as with VELCRO, snaps or other securing means 48 attached to opposing sides of the tether at about its free end. As seen in FIG. 1, this harness is being worn by an adult under the control of a guardian. Tether belt 42 is shown extended with tether loop 50 encircling the guardian's wrist. Any movement by the adult person is immediately felt by the guardian.

The harness also can be worn by the child or adult as a garment when the user is not under the manual control of the guardian. Further, the harness can be used as a restraining device when the user must be restrained from moving about. Thus, the user can be restrained by securing the tether belt to a restraining element such as a bedpost or chair or other securing element when the user is being confined to a bed or chair such as a wheel chair or a high chair. When the user is a child confined in a seat, such as in a car seat in an automobile or other vehicle, the tether belt 42 and reinforcing belt 52 can be used either alone or in combination with the car seat belt to confine the child therein.

Figure 7:
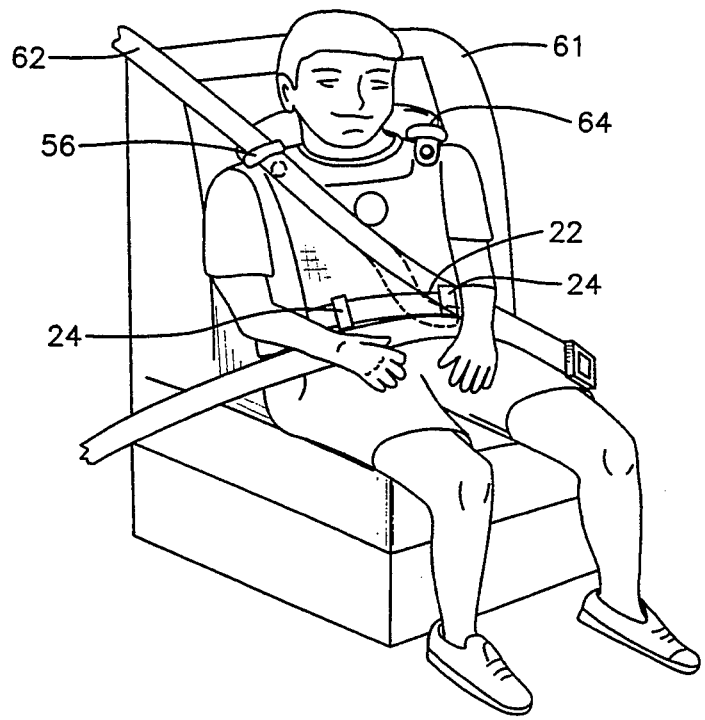
FIG. 7 is a perspective view of a child wearing a harness sitting in a vehicle seat.

Shown in FIG. 7 is a child in a vehicle seat, such as an automobile car seat, wherein the harness is used in conjunction with automobile shoulder strap and seat belt to confine the child therein. The automobile shoulder belt 62 passes through shoulder loop 56 down under the waist belt 22 and even the seat belt and into its locking device. The automobile lap belt can pass across the child's lap and then be secured to its locking device. Thus, the harness when used with the automobile shoulder straps 62 more firmly secures the child within the automobile seat to help support the child's entire body while allowing the shoulder strap to properly restrain the child. Head rest 64 which can be back pack 15a further protects the child in the automobile seat 61.

Figure 8:
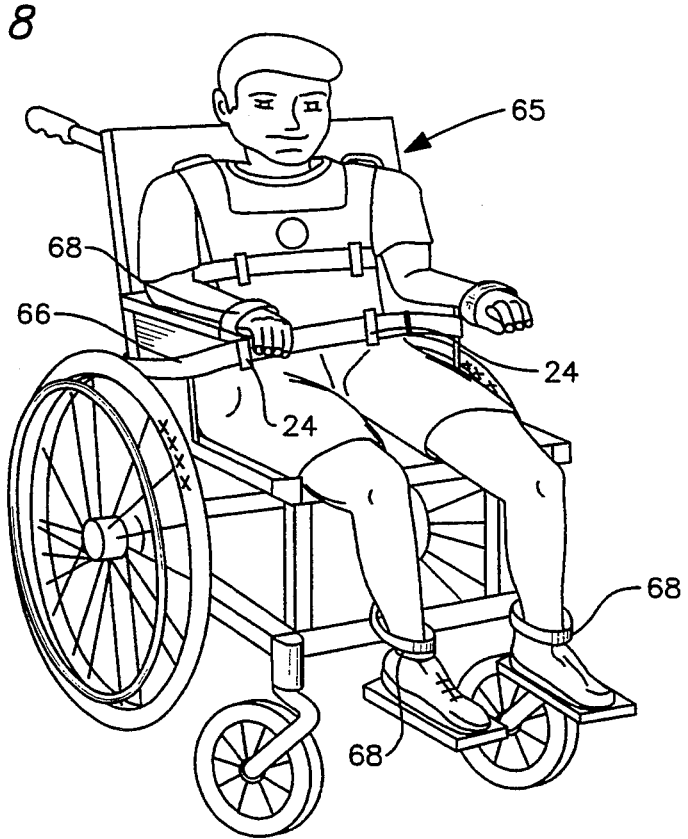
FIG. 8 is a perspective view of a person wearing a harness sitting in a wheel chair.

The harness can also be used in conjunction with an accessory belt to support a person confined in a wheel chair or other confined sitting arrangement. The accessory belts can be used in combination with the elements of the harness or can be used as an additional means of securing the person. Shown in FIG. 8 is a person wearing the harness who is confined to a wheel chair 65. An accessory belt 66 is shown being used in combination with the belt loops by passing through front waist belt loops 24 and around the back of the chair where it is secured by an adhering device such as VELCRO or equivalent adhering element. Accessory wrist and ankle belts 68 are seen as additional securing elements to support the confined person.

The preferred method of wearing the harness as a garment is to wear the tether belt 42 contained on the harness. An appropriate procedure in doing so when tether loop 50 is a releasable securing loop in that it forms a releasable loop at the end of the tether belt is to pass the tether belt 42 through back strap loops 23 around the waist area allowing releasable securing tether loop sections 48 to oppose each other as shown in FIG. 2. The opposing releasable securing tether loop sections 48 are then adhered together around a front or back loop 24 or 23, or can be passed through front and back loops 24 and 23 to be self-contained on the harness. The procedure followed will depend upon factors such as size of the user's waist and preference. An additional releasable securing tether loop section 60 is seen in FIG. 2 to further secure the tether belt to the waist belt. The process of containing the tether belt on the harness when tether loop 50 is preformed such as by sewing is done by passing it through loops 24 and 23 and releasably adhering it on itself by VELCRO or a similar releasable attachment.

The harness is constructed with relatively strong fabric material which is highly visible by sewing usually with strong threads preferably applied by industrial machinery. In one embodiment, the front vest is preferably constructed with double layers of materials that will secure to the straps, waist belt, reinforcing belt and tether belt. A preferred construction is to prepare the front vest wherein each layer contains a different material such as one layer being nylon and the other layer being breathable material such as a cotton blend. Another construction is to include three layers of material in the front vest wherein the nylon layer is sandwiched between two layers of breathable material such as a cotton blend. The breathable layer is intended to be on the interior of the front vest for added comfort in the chest area of the user.

A further preferred construction of the front vest is to have the nylon layer protected with a water repellant, water proof material. In this manner, the harness serves as a protective garment by keeping the upper torso of the user dry from exposure to the elements and also clean from any spillage of food or drink which can be wiped off. The water repellant, water proof can be applied to the nylon in a conventional manner. The breathable layer such as a cotton blend can insulate the water repellant, water proofed surface from the upper torso of the user. The harness of this invention in a further embodiment can also be reversible, so as to give the user an alternative choice of wear by having different designs or patterns or styles on each side. Shown in FIG. 4 is an example of how the reinforcing belt 52 can be passed through the belt buckle 32 in reversing the harness. The structure and location of the waist belt loops 24 and backstrap loops 23 and reinforcing belt loops 54, 56 and 58 permit the harness to be reversed without any problem. The harness can be worn with the nylon side exposed or the breathable side exposed depending upon the choice of the user.

Heavy ply nylon webbing has proven to have the best characteristics required for the backstraps, waist belt, reinforcing belt and tether belt. Strong cotton webbing and polypropylene also have been successfully used having a one inch width and ⅛ inch thickness to produce adequate strength for the belt for children. The secured criss-crossed back straps portions of the webbing give strength to the harness back portion and allows for proper fitting for the growth of the child, while still allowing for the fitting of the harness over the head of the person. Slight increases in the width and thickness of materials will be provided to meet the individual requirements of the various child and users.

An added feature of the harness of the invention, especially when it is a reversible harness, is that pockets can be provided on the front and back side of the vest. Shown in FIG. 2 is an example of a pocket 11 on the front of the vest whereas FIG. 3 depicts a pocket 13 on the interior of the harness. The pockets are especially helpful in permitting the user to carry special items as face cloths, cards, medication, toys, etc. Wet cloths can be carried in the front pocket without any problem when the front vest is water repellant, water proofed.

Another added feature of the harness is to provide a back pack to carry special items which may be too large to be carried in the pockets or wherein the back pack may be the preferred location for carrying certain items. Seen in FIG. 4 is back pack 15 which is releasably attached to the top of back straps 20 by means of VELCRO 17 as shown on the back straps. Other releasable attachment devices such as snaps or equivalent devices are operable and are often used. The preferred attachment device for securing back pack elements to the harness is frictional snaps. Shown in FIGS. 2 and 4 are snaps 18 attached at the shoulder area where back straps 20 join together with front vest 12. Snaps 18 permit other back pack elements containing mating frictional snaps to be secured to snaps 18. On the opposing underside of back straps 20, not shown, is a releasable attachment of VELCRO for attachment of other back pack elements when the harness is reversed. The back pack elements are releasably attached thereto by means of VELCRO strips secured to the top of the back pack.

A most important aspect of the back pack is that it provides a number of uses for the physically handicapped as well as for children. For example, it provides a carrier for various items such as items too large for the pockets and articles of clothing as well as serving as a carrier for medication to be within easy reach of the guardian. For children, it provides a carrier for lunches and various accessories.

Figure 5:
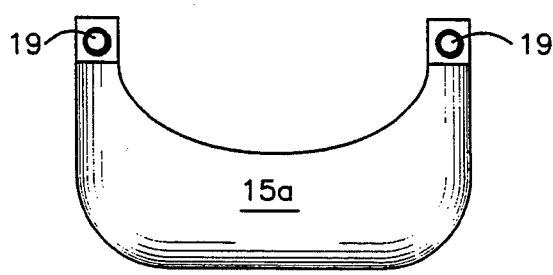
FIG. 5 is a view of a back pack inflatable pillow element.
Figure 6:
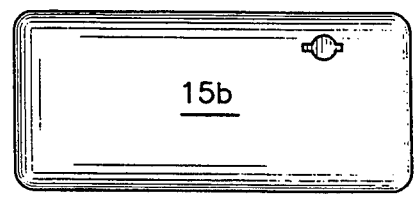
FIG. 6 is a view of a back pack pillow element.

An additional feature of the back pack 15 is that it can be converted to a pillow by having cushioning material, such as flexible foam, inserted therein. Also, a pillow element can be releasably attached to the harness to replace the back pack 15. Shown in FIGS. 5 and 6 are the types of pillow elements which can be used to replace the back pack 15. In FIG. 5 is seen a back pack pillow element 15a which contains a cushioning material and can be releasably secured to the harness by means of its frictional snaps 19 which mate with snaps 18 as previously described. In FIG. 6 is seen an inflatable pillow element which can be releasably secured to the harness also with frictional snaps not shown. Such pillow elements are extremely important features especially with respect to children and adults who require periods of rest. Since the elements 15, 15a and 15b used as pillows are flexibly attached to the harness, the pillow elements can be used by the user while in a sitting position as a headrest or when lying down.

Figure 9:
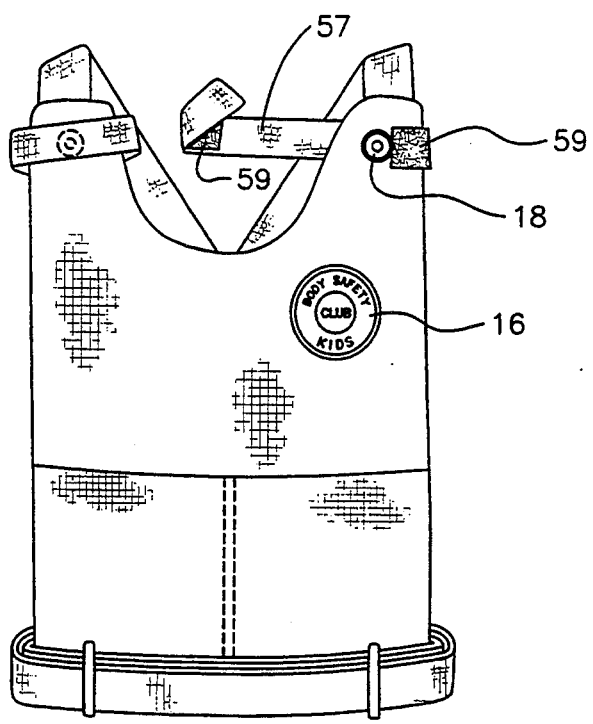
FIG. 9 is a perspective view of another preferred embodiment of the front of a harness.
Figure 10:
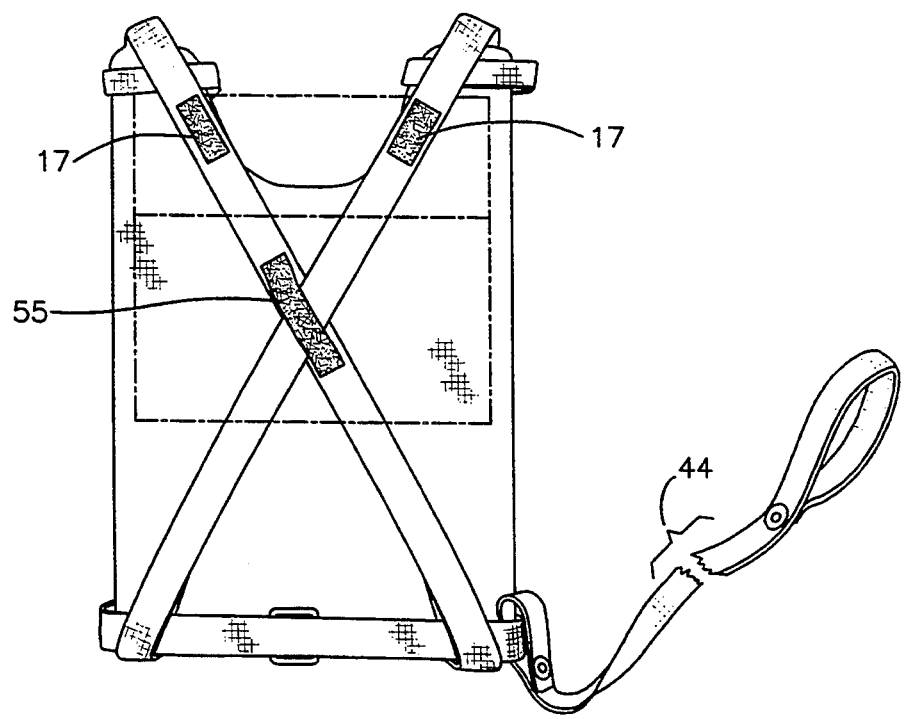
FIG. 10 is a perspective view of a further preferred embodiment of the back of a harness.
Figure 11:
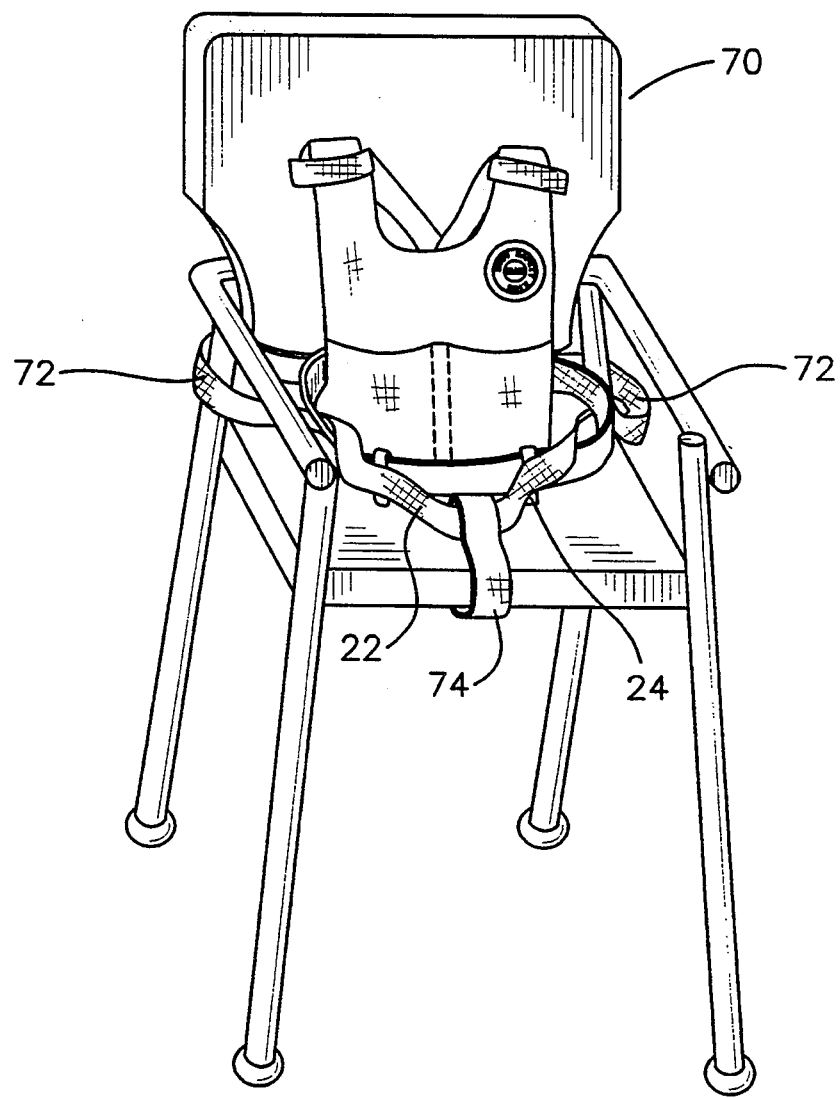
FIG. 11 is a perspective view of a harness attached to a high chair.

FIGS. 9, 10 and 11 are directed to further preferred embodiments of the harness. Shown in FIG. 9 depicts a view of the front vest showing frictional snaps 18, releasably attached reinforcing loops 57 and logo entity 16 which is placed in the side of the front vest. The arrangement of snaps 18 and reinforcing loops 57 allows for an efficient and flexible attachment of the back pack elements 15, 15a and 15b to snaps 18 to serve as back packs, pillows, head rests or otherwise. Releasable reinforcing loops 57 can be releasably secured by releasable attachments 59 such as VELCRO or other attachments which also permit easy attachment of the automobile shoulder strap 62 to more safely restrain a child therein.

Seen in FIG. 10 are criss-crossing back straps 20 showing releasable attachments 55 and 17 such as VELCRO or other attachments suitable for attaching back pack elements 15, 15a or 15b or other attachable elements. An added feature shown is a releasably attached tether belt 44 attached to waist belt 22. This arrangement allows the tether belt to be set at any required length depending upon the situation.

FIG. 11 is directed to an example of how the harness can be combined with a high-chair 70 to support and confine a child not shown, therein. Seen in FIG. 11 is accessory belt 72 passing around the back of the highchair and under waist belt 22 and across it with option of using belt loops 24 and passing through chair midstrap 74, and optional opposite belt loop 24, and around side and back under waist belt 22 and back around back of high chair to secure. The combination of going under the harness waist belt and through mid-strap 74, and back under the opposite side of waist belt 22, firmly secures the child and prevents him from standing up or from sliding out.

Belt loops 24, 23, 54, 56, 57 and 58 are preferably made of a sturdy fabric such as nylon depending upon the requirements of the person using the harness. They also may include securing means and a VELCRO on either side to aid in accessory use. The preferred belt buckle is made of durable plastic or metal with double bar openings containing locking teeth. Waist belt 22 is then secured within the locking teeth to overcome any pressure exerted by attempting to pull it apart. Equivalent belt buckles of equal strength and durability are applicable.

Major feature of the safety harness are that it is a unified vest harness that fits over the head of the child or adult. It is difficult to remove not only by the child or adult wearing it but also by any other person attempting to remove it without authority to do so. It helps to support the person's upper body. It lends support and helps to combat physical infirmities of a physically afflicted person. It helps to protect and to restrain a small child when used in conjunction with the restraining straps in an automobile car seat, high chair, wheel chair or other seating arrangement or in a bed. It allows for a child's growth. It is durable, washable and has its own self-contained tether belt which will always be available for attaching to the guardian's wrist or to a restraining element if the person has to be restrained which cannot be removed by the restrained person when so attached. It helps protect the person from the elements and helps protect the upper torso from spillage of food and drink. It gives the user a choice of alternative wear when reversible. It allows freedom of movement by the user while being restrained. It can be worn for long periods of time and is versatile enough to be worn to any event or recreation. It also represents a sense of membership and peer status to the child, and aids the child or adult to be more safety conscious. The use of the safety and restraining harness by the person is also a means of identification of that person.

The growth feature of the harness is that it can grow with the child allowing it to be used for a number of years. This is so because the waist belt can be adjusted by belt buckle 32 permitting expansion of the garment with the increased growth of the child. Also, the harness can be worn higher on the waist up onto the chest of the child making a bib vest harness as the child increases in height and retains its safety features.

Emblem 14, as illustrated in FIG. 2, displays logo 16, which, conforms to U.S. Trademark Reg. No. 1,538,277, showing the name of the Club organization—BODY SAFETY KIDS CLUB. The logo is intended to alert the public that the person is a member of the Safety Club. With respect to the code identification 46 shown on back of the emblem in FIG. 3, the code can be applied by any permanent marking method. From this code, the authorities will then be able to contact the logo entity and to initiate the identification procedure. U.S. Trademark Reg. No. 1,538,277 is registered to one of the inventors. Applicants' U.S. Pat. No. 5,069,168 is directed to the method of identifying the lost child in accordance with the BODY SAFETY KIDS CLUB. This method of identifying the child is likewise applicable to identifying a user of the harness of the present invention. The emblem 14 can also be used to represent other entities as desired.

While certain novel features of this invention have been shown and described, it will be understood that various changes in the forms and details of the harness and associated safety application illustrated and in operations thereof can be made by those skilled in the art without departing from the spirit of the invention.

PARTS LIST

10 Harness
11 Front Double Pocket
12 Front Vest
13 Interior Pockets (on inside of harness)
14 Emblem
15 Replaceable Back Pack
15a Replaceable Back Pack with cushioning material
15b Replaceable Inflatable Pillow
16 "Body Safety Kids Club" or Logo Entity
17 Back pack securing element
18 Frictional Snaps on Harness
19 Frictional Snaps on Back Pack
20 Back Straps
22 Waist Belt
23 Back Strap Loop
24 Front Waist Belt Loops
30 Fastened End of Waist Belt (joined at Buckle Bar 34
32 Belt Buckle
34 Belt Buckle Bar
36 Free end element of Waist Belt 22
38 Locking teeth of buckle
42 Tether belt
44 Releasable Attached Tether Belt
46 Identification on inside of Emblem
48 Tether Loop securing means
50 Tether Loop
52 Reinforcing belt
54 Reinforcing loop (crisscrossing loop)
56 Reinforcing loop (shoulder loops)
57 Releasable Reinforcing Loop
58 Reinforcing loop (mid-loops)
59 Releasable Attachment
60 Releasable securing means for tether belt
61 Automobile seat
62 Automobile shoulder belt
64 Head Rest
65 Wheel chair
66 Accessory belt for wheel chair
68 Accessory wrist and ankle belts
70 High-chair
72 Accessory belt for high-chair
74 Mid-strap of high-chair

What is claimed is:

1. A reinforced safety harness for a person comprising a unified vest harness including a front vest, a pair of criss-crossing back straps, a waist belt, a reinforcing belt, a tether belt and an adjustable means the front vest having a top, bottom and sides sized for covering the upper front torso of the person, the back straps sized for fitting over the back of the person in a criss-crossing fashion from top to bottom and secured to the top of the front vest and releasably secured at the bottom to the waist belt, the waist belt sized for encircling the front and back torso of the person, with the front encircling portion of the waist belt secured to the bottom of the front vest and the back encircling portion of the waist belt adjustably positioned and secured by the adjustable means, the reinforcing belt extending from the adjustable means and being adjustably mounted about the harness to reinforce it, the tether belt extending from the reinforcing belt and terminating either around a guardian's wrist or on a restraining element or releasably secured around the waist belt, the adjustable means allowing the waist belt to be varied in size which varies the length of the reinforcing belt, whereby said harness is put on over the person's head and secured by said adjustable means and said reinforcing belt to help support the person's upper torso, whereby said tether belt can be worn either encircling the waist belt and attached thereon or extending freely to be held by a guardian or releasably secured to a restraining element.

2. A safety harness according to claim 1 which is prepared from fabric material.

3. A safety harness according to claim 2 wherein said fabric material provides reversible sides.

4. A safety harness according to claim 3 wherein said reversible sides provide a waterproof side and opposing breathable side.

5. A safety harness according to claim 4 wherein said water proof side provides a layer of nylon coated with water repellant material.

6. A safety harness according to claim 5 wherein said breathable side provides a layer of a cotton blend.

7. A safety harness according to claim 6 wherein the water repellant nylon is sandwiched between two cotton blend layers.

8. A safety harness according to claim 3 wherein the top of said back straps contain releasably securing means for attachment of a back pack.

9. A safety harness according to claim 8 wherein said releasably securing means for attachment of the back pack are located on each side of the back straps.

10. A safety harness according to claim 2 wherein said harness helps restrain a child sitting in a vehicle seat.

11. A safety harness according to claim 10 wherein said vehicle seat contains shoulder securing straps used in conjunction with the harness.

12. A safety harness according to claim 11 wherein the vehicle securing straps pass through a shoulder securing strap on the harness.

13. A safety harness according to claim 1 wherein reinforcing belt loops are mounted on the harness.

14. A safety harness according to claim 13 wherein said reinforcing belt extends through reinforcing belt loops mounted at the criss-crossing of the back straps and at the top of the back straps.

15. A safety harness according to claim 13 wherein said reinforcing belt extends through reinforcing belt loops mounted at the criss-crossing of the back straps and at the sides of the front vest.

16. A safety harness according to claim 13 wherein said reinforcing belt extends through reinforcing belt loops mounted on the waist belt, at the criss-crossing of the back straps and at the top of the back straps.

17. A safety harness according to claim 13 wherein said reinforcing belt extends through reinforcing belt loops mounted in the front and back of the harness.

18. A safety harness according to claim 13 wherein the tether belt extends from the reinforcing belt and is secured to a restraining element.

19. A safety harness according to claim 1 wherein the tether belt is self-contained on the waist belt.

20. A safety harness according to claim 19 wherein the tether belt is self-contained by adhering means.

21. A safety harness according to claim 20 wherein said tether belt is released from the waist belt and is held releasably self-contained on the guardian's wrist.

22. A safety harness according to claim 1 wherein the tether belt is releasably attached to the waist belt.

23. A safety harness according to claim 1 wherein said front vest provides at least one pocket.

24. A safety harness according to claim 23 wherein at least one pocket is mounted on the front surface of the vest.

25. A safety harness according to claim 24 wherein at least one pocket is mounted on the back surface of the vest.

26. A safety harness according to claim 1 wherein a back pack is releasably mounted thereon 27. A safety harness according to claim 26 wherein said back pack contains a cushioning material to form a pillow.

28. A safety harness according to claim 27 wherein said back pack is releasably secured to the top area where said back straps and said front vest join.

29. A safety harness according to claim 1 wherein a pillow element is releasably mounted thereon.

30. A safety harness according to claims 29 wherein said pillow element is an inflatable device.

31. A safety harness according to claim 1 wherein said harness helps restrain a person sitting in a chair.

32. A safety harness according to claim 31 wherein the person is secured to the chair by at least one accessory belt in conjunction with the harness.

33. A safety harness according to claim 32 wherein the at least one accessory belt passes through at least one loop on the harness.

34. A safety harness according to claim 33 wherein said chair contains a mid-strap and said at least one accessory belt passes through said mid-strap.

35. A safety harness according to claim 32 wherein said at least one accessory belt secures the person's hands and/or feet to the chair.

36. A safety harness according to claim 35 wherein the chair is a wheel chair.

37. A safety harness according to claim 1 wherein an emblem is mounted thereon.

38. A safety harness according to claim 37 wherein said emblem contains an identification means for said person.

39. A safety harness according to claim 38 wherein said identification means provides a logo.

40. A safety harness according to claim 37 wherein said emblem is mounted on the exterior of the front vest.

* * * * *